US011950154B2

(12) United States Patent
Raghavan et al.

(10) Patent No.: US 11,950,154 B2
(45) Date of Patent: Apr. 2, 2024

(54) NEIGHBOR CELL TRANSMISSION CONFIGURATION INDICATOR (TCI) STATE SWITCH

(71) Applicant: Apple Inc., Cupertino, CA (US)

(72) Inventors: Manasa Raghavan, Sunnyvale, CA (US); Yushu Zhang, Beijing (CN); Dawei Zhang, Saratoga, CA (US); Haitong Sun, Cupertino, CA (US); Huaning Niu, San Jose, CA (US); Jie Cui, San Jose, CA (US); Qiming Li, Beijing (CN); Xiang Chen, Campbell, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 285 days.

(21) Appl. No.: 17/440,693

(22) PCT Filed: Apr. 1, 2021

(86) PCT No.: PCT/CN2021/084933
§ 371 (c)(1),
(2) Date: Sep. 17, 2021

(87) PCT Pub. No.: WO2022/205309
PCT Pub. Date: Oct. 6, 2022

(65) Prior Publication Data
US 2023/0224777 A1 Jul. 13, 2023

(51) Int. Cl.
*H04W 36/06* (2009.01)
*H04W 36/00* (2009.01)
(52) U.S. Cl.
CPC ....... *H04W 36/06* (2013.01); *H04W 36/0061* (2013.01); *H04W 36/0077* (2013.01)

(58) Field of Classification Search
CPC ............ H04W 36/06; H04W 36/0061; H04W 36/0077; H04W 72/23; H04W 16/28
See application file for complete search history.

(56) References Cited

U.S. PATENT DOCUMENTS 11,050,536 B2 * 6/2021 Zhou ................... H04L 5/0007
2023/0239123 A1 * 7/2023 Zhou ................... H04L 5/0023
370/329

FOREIGN PATENT DOCUMENTS

| CN | 111656839 | 9/2020 |
| CN | 112398615 | 2/2021 |

(Continued)

OTHER PUBLICATIONS

3rd Generation Partnership Project; Technical Specification Group Radio Access Network; NR; Requirements for Support of radio resource management (Release 16), 3GPP TS 38.133 V16.6.0, Dec. 2020, 1844 pages.

(Continued)

*Primary Examiner* — Chandrahas B Patel
(74) *Attorney, Agent, or Firm* — Kilpatrick Townsend & Stockton LLP

(57) ABSTRACT

The present application relates to devices and components including apparatus, systems, and methods to perform a switch of a TCI state from a serving cell to a neighbor cell. A UE determines whether the state of the neighbor cell is known or unknown and whether the neighbor cell's TCI state is known or unknown. The total delay time to perform the TCI state switch can impacted by this the known/unknown statuses. Other factors can also contribute to the total delay time. The UE may also signal its capability to monitor the TCI state of the neighbor cell and its capability to switch to such a TCI state.

20 Claims, 11 Drawing Sheets

(56) References Cited

FOREIGN PATENT DOCUMENTS

WO      2020076439      4/2020
WO      2020231834    11/2020

OTHER PUBLICATIONS

[CR] Editorial corrections for 38.133 R15 Core Part, ZTE Corporation, R4-2008660, 3GPP TSG-RAN WG4 Meeting #95-e, Jun. 5, 2020, 11 pages.

International Patent Application No. PCT/CN2021/084933, International Search Report and Written Opinion, dated Jan. 4, 2022, 9 pages.

3rd Generation Partnership Project; Technical Specification Group Radio Access Network; NR; Requirements for support of radio resource management (Release 17), 3GPP TS 38.133 V17.0.0, Dec. 2020, 1812 pages.

\* cited by examiner

NEIGHBOR CELL TRANSMISSION CONFIGURATION INDICATOR (TCI) STATE SWITCH

CROSS-REFERENCE TO RELATED APPLICATIONS

This application is a U.S. National Stage Application of PCT/CN2021/084933, filed Apr. 1, 2021. The disclosure of which is herein incorporated by reference in its entirety for all purposes.

Fifth generation mobile network (5G) is a wireless standard that aims to improve upon data transmission speed, reliability, availability, and more. In 5G new radio (NR), a transmission configuration indication (TCI) state is used to establish the quasi co-location (QCL) connection between a target reference signal (RS) and a source RS. TCI states are configured for a physical downlink control channel (PDCCH) or a physical downlink shared channel (PDSCH) in order to convey the QCL indication for the respective RS.

DETAILED DESCRIPTION

Figure 1:
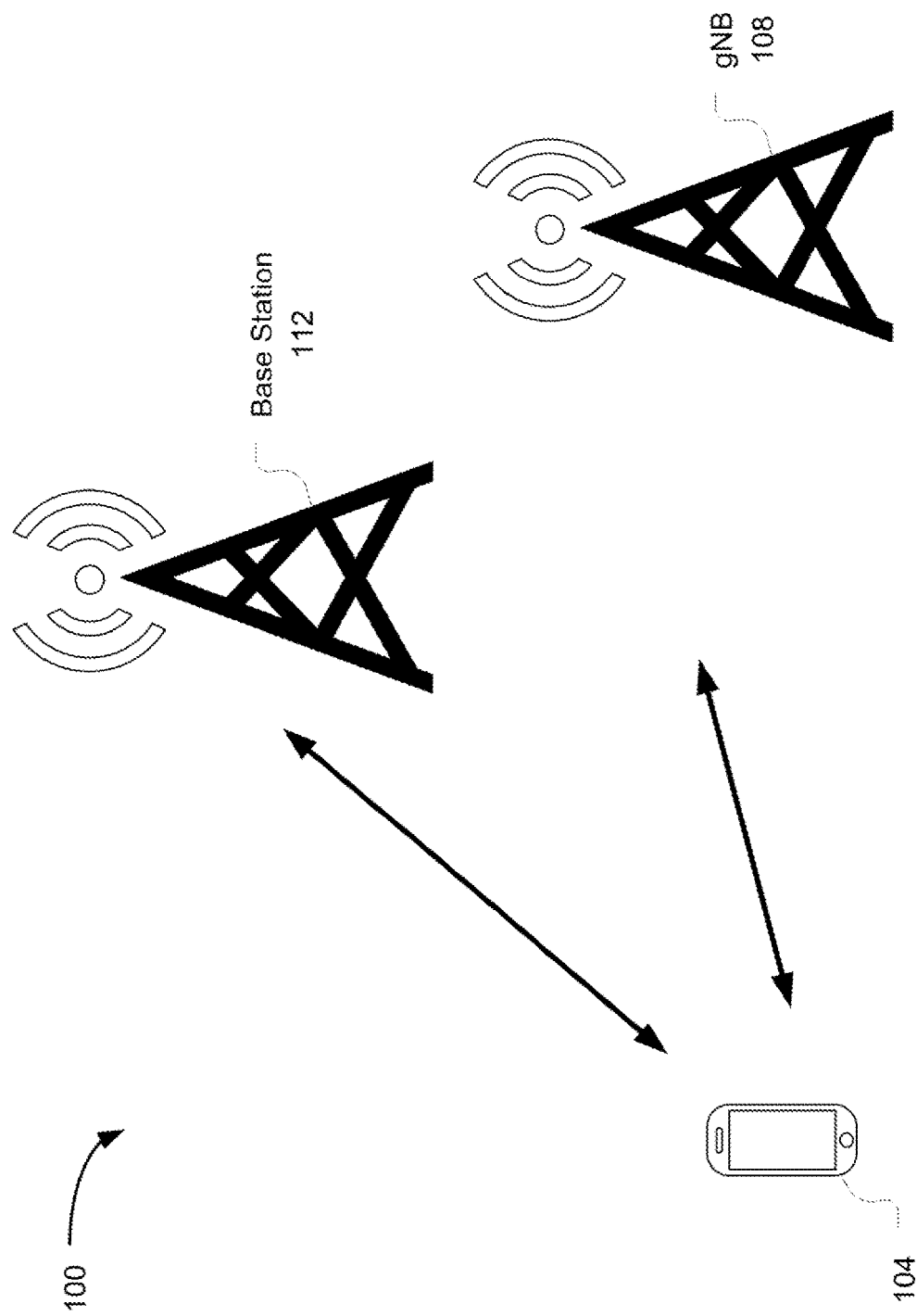
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) may be configured to receive and transmit in a serving cell, whereby the UE uses a transmission configuration indication (TCI) state for the reception. A neighbor cell may exist. It may be desired to switch this TCI state to a TCI state of the neighbor cell in order to enable the UE to receive in the neighbor cell. To do so, a TCI state switch command can be sent from the network to the UE, requesting the UE to switch to the neighbor cell's TCI state. In an example, the network can send the TCI state switch command by using layer 1 (L1) signaling (e.g., downlink control information (DCI) or layer 2 (L2) signaling (e.g., a media control access (MAC) control element (CE)) to trigger a handover from the serving cell to the neighbor cell. By using L1 or L2 (L1/L2) signaling, the handover can take less time relative to when radio resource control (RRC) reconfiguration signaling is used.

This type of TCI switch command can be enabled for inter-frequency and intra-frequency cells. The UE can determine whether the state of the neighbor cell is known or unknown and/or whether the TCI state of the neighbor cell is known or unknown. Such TCI state switch conditions can impact the total delay time needed to complete the switch to the neighbor cell's TCI state and, in the case of the handover, to complete the handover. Other factors can also impact the total delay time and include, for instance, whether a MAC CE or DCI is used for the TCI state switch command, time for timing offset/frequency offset (TO/FO) tracking, time for active bandwidth part (BWP) switch, or UE processing time. Further, the UE can send a random access channel (RACH) message to indicate the completion, in which case the total delay time may also depend on RACH occasion uncertainty. During the TCI state switching, the UE interruptions to reception and/or transmission on another serving component carriers (CC) may be allowed, where the time length of the interruptions may be based on the numerology or slot length of the other serving CC.

In addition, the UE can signal its capability to monitor TCI states of neighbor cells. If capable of doing so, the UE may maintain the TCI state of the neighbor cell in a list of active TCI states prior to receiving the TCI state switch command. Further, the UE can signal its capability to perform neighbor cell TCI state switching in support of L1/L2 centric inter-cell handover.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network element of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band (between 40 Megahertz (MHz) and 7,125 MHz) and/or frequency range 2 (FR2) band (between 24,250 MHz and 52,600 MHz). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station 112. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via an SCell activation procedures where the component carriers of these serving cells can be intra-band contiguous, intra-band noon-contiguous, or inter-band. The serving cells can be collocated or non-collocated.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread. In QCL Type C, antenna ports share Doppler shift and average delay. In QCL Type D, antenna ports share spatial receiver parameters.

The gNB 108 may provide TCI state information to the UE 104 to indicate QCL relationships between antenna ports used for reference signals (for example, synchronization signal/PBCH or CSI-RS) and downlink data or control signaling, for example, PDSCH or PDCCH. The gNB 108 may use a combination of RRC signaling, MAC control element signaling, and DCI to inform the UE 104 of these QCL relationships.

TCI states are configured for PDCCH, PDSCH and CSI-RS in order to convey the QCL indication for the respective reference signal (RS). In FR1 QCL Types A-C and in FR2 QCL types A-D are applicable. The QCL Type D for FR2 indicates that PDCCH/PDSCH/CSI-RS is transmitted with the same spatial filter as the reference signal associated with that TCI. In FR2, the network can indicate a transmit beam change for PDSCH or PDCCH by switching the TCI state.

The UE 104 may be configured with a TCI list for PDSCH and PDCCH via RRC. The TCI states for PDCCH is a subset of those for PDSCH. For PDCCH, the network configures the active TCI state via MAC CE. RRC can configure up to one-hundred twenty-eight TCI states for PDSCH. The UE can have up to eight activated TCI states via MAC CE, although the embodiments of the present disclosure are not limited as such.

When the UE 104 is configured with the higher layer parameter tci-PresentlnDCI that is set as 'enabled' for the CORESET scheduling the PDSCH, the TCI field is present in DCI format 1_1. If the scheduling offset between scheduling and PDSCH is larger than Threshold-Sched-Offset and TCI field is present, the TCI state for PDSCH is indicated via DCI. If the tci-PresentlnDCI is not configured or PDSCH is scheduled using DCI format 1_0 or the scheduling offset between PDCCH and PDSCH is smaller than Threshold-Sched-Offset, PDSCH follows the TCI of PDCCH. Threshold-Sched-Offset is based on UE capability timeDurationForQCL.

TCI state change and corresponding beam switch may be initiated via MAC CE or DCI. When TCI for PDSCH is indicated by DCI, the TCI state or beam switch can be configured via DCI. DCI based TCI state switch is applicable to PDSCH. When PDSCH follows the TCI state of PDCCH, for a beam switch, the TCI state of PDCCH is first initiated via MAC CE. Hence, MAC CE-based TCI state switch can be applicable to PDCCH.

When the network activates a new TCI state via MAC CE for PDCCH or via DCI for PDSCH, the UE 104 is allowed some time to prepare to receive with the new TCI state. In order to successfully receive with the new TCI state, the UE 104 needs to know the receive (RX) beam corresponding to the new TCI state and the relevant time offset/frequency offset (TO/FO). The network could indicate a TCI state change for PDCCH via MAC CE and for PDSCH via DCI. As further described herein below, this change can be to a TCI state of a neighbor cell and can occur within the context of a handover from a serving cell associated with the current TCI state to the neighbor cell that is the target of the TCI state switch.

Figure 2:
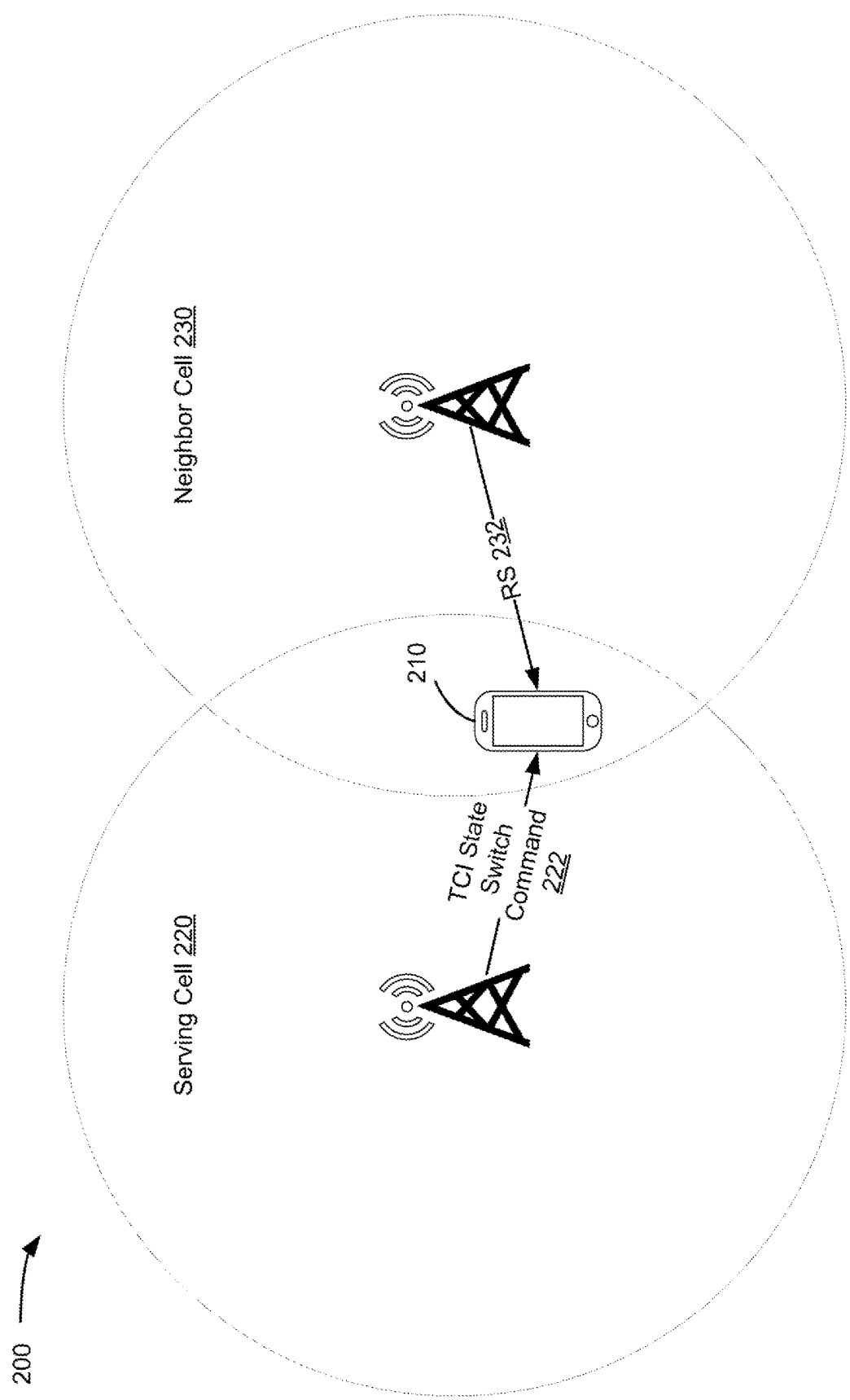
FIG. 2 illustrates an example of a layer 1 or layer 2 (L1/L2) inter-cell mobility based on a transmission configuration indication (TCI) state switch, in accordance with some embodiments.

FIG. 2 illustrates an example of a layer 1 or layer 2 (L1/L2) inter-cell mobility based on a transmission configuration indication (TCI) state switch, in accordance with some embodiments. In the illustration of FIG. 2, the L1/L2 inter-cell mobility refers to a handover from a serving cell to a neighbor cell, where this handover is triggered with L1 signaling or L2 signaling, rather than RRC reconfiguration signaling.

A handover can be performed to move communications of a UE 210 from a current serving cell 220 to a neighbor cell 230 (e.g., an adjacent cell), while the UE 210 moves through the network coverage area. The handover can be an inter-frequency handover (e.g., the two cells 220 and 230 use the same frequency band) or an intra-frequency handover (e.g., the two cells 220 and 230 use different frequency bands). The L1 signaling can be DCI indicating a TCI state change, whereas the L2 signaling can be MAC CE indicating a TCI stage change. In both cases, the target cell associated with the TCI stage change is the neighbor cell 230.

In an example, the network sends in the serving cell 220, a TCI state switch command 222 to the UE 104. This state switch command 222 triggers a switch from the current TCI state associated with the serving cell 220 to the TCI state of the neighbor cell 230. This TCI state switch command 222 can be DCI or MAC CE. Upon completion of the switch, the neighbor cell's 230 TCI state is usable by the UE 104 for communications, including at least reception, in the neighbor cell 230. For instance, the TCI state switch command 222 represents a trigger for the handover.

The neighbor cell 230 can be indicated (e.g., its cell ID) to the UE 210 via RRC signaling or the TCI state switch command 222 (e.g., the DCI or MAC CE). Further, prior to the TCI state switch command 222 being sent, the network can configure the UE 210 with parameters of the neighbor cell 230 (e.g., radio bearer configuration, measurement configuration, SCell group configuration, and the like). This configuration can be accomplished via RRC signaling other than a RRC reconfiguration message.

A RS 321 can be sent in the neighbor cell 230. Upon completion of the TCI state switch (or, similarly, the handover), the UE 210 can receive the RS 321 with the TCI indicated by the TCI state associated with the neighbor cell 230.

As such, L1/L2 based handover can be achieved via DCI or MAC-CE TCI State switch. Doing so can reduce handover time compared to L3/RRC based handover. The TCI state switch can support an intra-frequency handover and an inter-frequency handover. As further described herein below, the completion of the TCI switch from the serving cell 220 to the neighbor cell 230 (or, similarly, the L1/L2 based handover) can be performed within a total delay time that is subject to whether the state of the neighbor cell is known or unknown and/or whether the state of the neighbor cell's 230 TCI state is known or unknown, among other factors. The TCI state switching can impact transmit or receive operations of the UE 210 on other serving CCs, in which case permitted interruptions may be defined.

Figure 3:
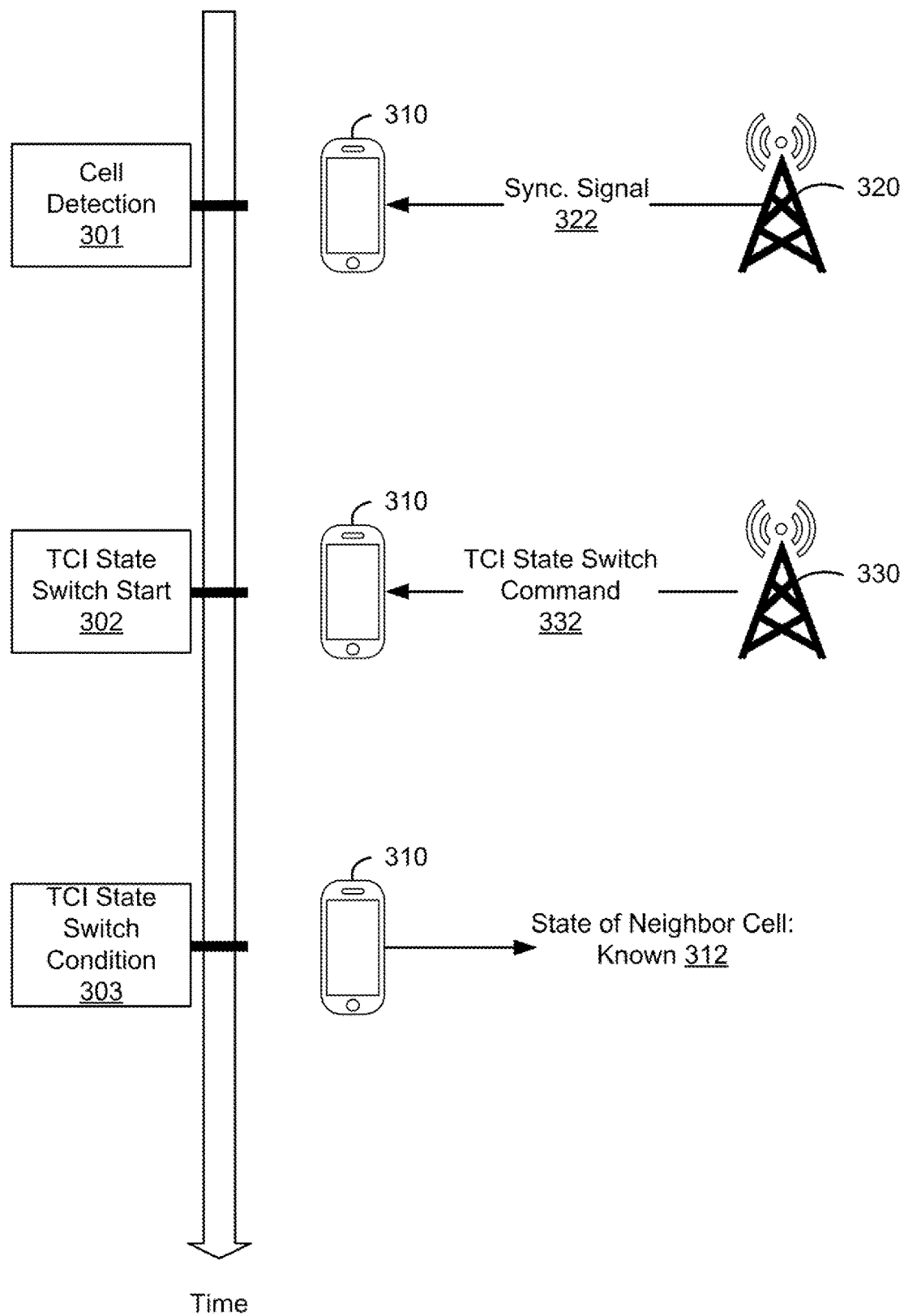
FIG. 3 illustrates an example of determining whether a state of a neighbor cell is known or unknown, in accordance with some embodiments.

FIG. 3 illustrates an example of determining whether a state of a neighbor cell is known or unknown, in accordance with some embodiments. Generally, the neighbor cell is a target cell. The state of the neighbor cell is known to a UE 310 if, at least, this target cell has been detected previously by the UE 310. Otherwise, the state of the neighbor cell is unknown to the UE 310. This type of state condition is illustrated in FIG. 3. Additional state conditions may be defined, whereby, for instance, the state is known if an RX beam usable by the UE 310 to receive in the neighbor cell is also known to the UE 310 and/or if the TCI state of the neighbor cell is part of active states maintained by the UE 310.

In an example, a base station 320 (e.g., a gNB) provides communications to UEs in a neighbor cell. The UE 310 is communicating with another base station 330 (e.g., a gNB) of a serving cell. No handover of the UE 310 from the serving cell to the neighbor cell may have occurred yet.

The state of the neighbor cell is known to the UE 310 if the neighbor cell is detected by the UE 310 (illustrated as a cell detection 301 in FIG. 3). Otherwise, the state is unknown. The cell detection 310 can include, for instance, receiving and detecting a synchronization signal 322 from the base station 322 (e.g., a primary a synchronization signal (PSS) or a secondary synchronization signal (SSS) transmitted in an SSB), detecting an SSB index, and/or performing an SSB measurement.

In the illustration of FIG. 3, subsequent to the cell detection 301, the network may trigger a switch of a TCI state from the serving cell to the neighbor cell. The start of this switch is illustrated as a TCI state switch start 302 and corresponds to receiving a TCI state switch command 332. In an example, the TCI state switch command 332 can be sent from the network via the base station 330, whereby the base station 330 transmits it to the UE 310 in DCI or MAC CE.

Next, and as part of performing the TCI state switch to the neighbor cell, the UE 310 determines the state of the neighbor cell (illustrated as a TCI state switch condition 303, which in the context of FIG. 3 includes determining the state condition of the neighbor cell (e.g., being known or unknown to the UE 310)). Here, this state is known 312 because the UE 310 has previously detected the neighbor cell 320 (e.g., per the cell detection 301). However, if the neighbor cell was not detected prior to receiving the TCI switch command 322, the UE 310 would determine that the neighbor cell's state is unknown.

Figure 4:
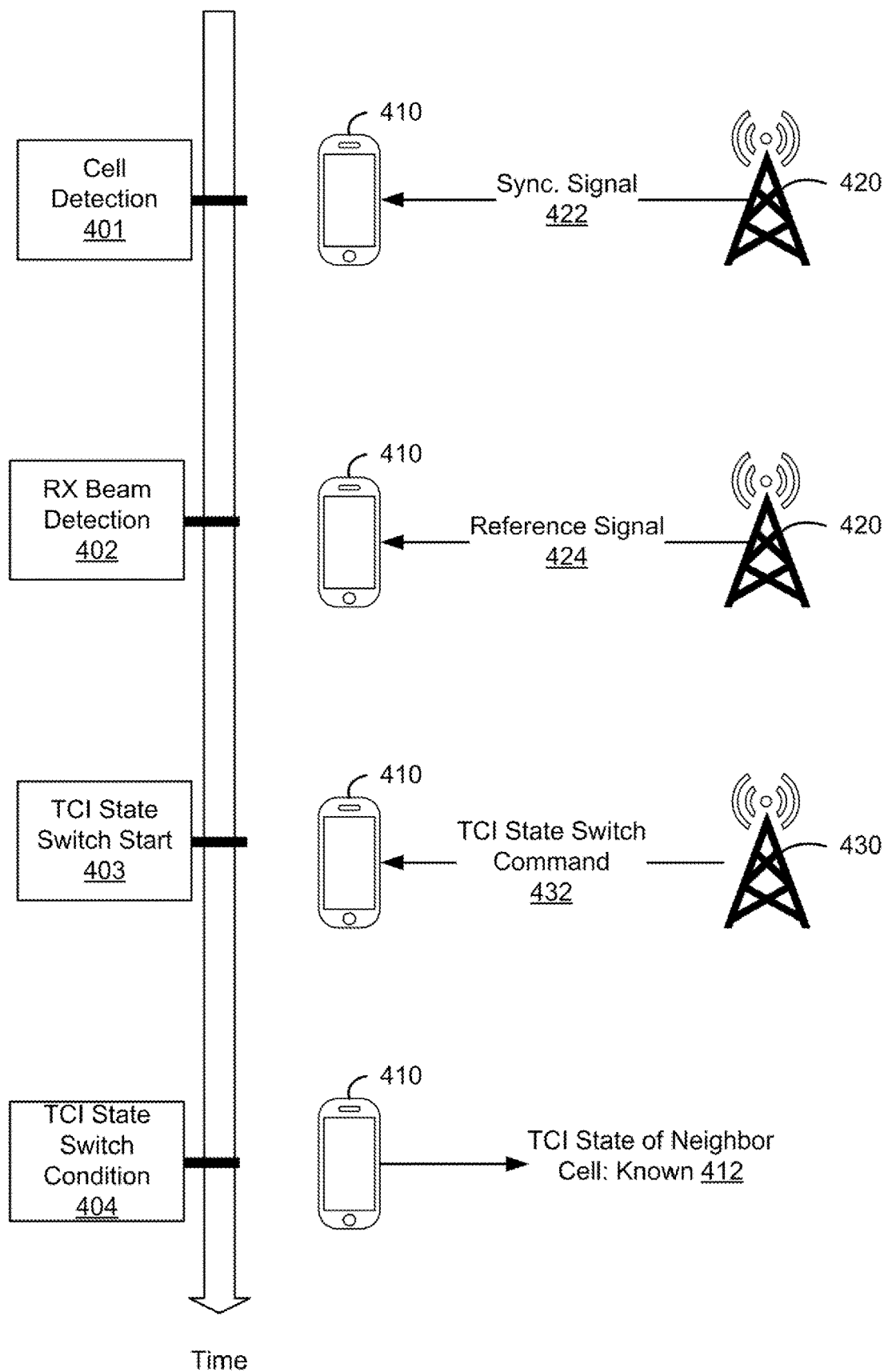
FIG. 4 illustrates an example of determining whether a TCI state of a neighbor cell is known or unknown, in accordance with some embodiments.

FIG. 4 illustrates an example of determining whether a TCI state of a neighbor cell is known or unknown, in accordance with some embodiments. Generally, the neighbor cell is a target cell and its TCI state is a target TCI state. The target TCI state is known to a UE 410 if, at least, an RX beam usable by the UE 410 to receive on the target cell is known to the UE 410. Otherwise, the target TCI state is unknown to the UE 410. The RX beam is known to the UE 410 if the UE 410 has measured and report a measurement on an RS (e.g., an L1-RSRP measurement) for the target TCI state within a certain time prior to receiving a TCI state switch command associated with switching the UE 410 to the target TCI state. This type of state condition is illustrated in FIG. 4. Additional state conditions may be defined, whereby, for instance, the target TCI state is known if the state of the neighbor cell is known (e.g., the neighbor cell is detected) and/or if the target TCI state is part of active states maintained by the UE 410.

In an example, a base station 420 (e.g., a gNB) provides communications to UEs in a neighbor cell. The UE 410 is communicating with another base station 430 (e.g., a gNB) of a serving cell. No handover of the UE 410 from the serving cell to the neighbor cell may have occurred yet.

The neighbor cell is known to the UE 410 if the neighbor cell is detected by the UE 410 (illustrated as a cell detection 401 in FIG. 4). Otherwise, the neighbor cell is unknown to the UE 410. The cell detection 410 can include, for instance, receiving and detecting a synchronization signal 422 from the base station 422 (e.g., a PSS or an SSS transmitted in an SSB), detecting an SSB index, and/or performing an SSB measurement.

In the illustration of FIG. 4, an RX beam detection 402 includes the UE 410 detecting whether an RX beam is in the neighbor cell is known to the UE 410. When the RX beam detection 402 occurs within a certain time period prior to receiving a TCI switch command 432, the TCI state of the neighbor cell may be known to the UE 402. This RX beam detection 402 can include, for instance, the UE 410 receiving an RS 424 from the base station 420, performing measurements (e.g., L1-RSRP) on the RS, and reporting these measurements to the network.

Subsequent to the RX beam detection 402, the network may trigger a switch of a TCI state from the serving cell to the neighbor cell. The start of this switch is illustrated as a TCI state switch start 403 and corresponds to receiving a TCI state switch command 432. In an example, the TCI state switch command 432 can be sent from the network via the base station 430, whereby the base station 430 transmits it to the UE 410 in DCI or MAC CE.

Next, and as part of performing the TCI state switch to the neighbor cell, the UE 410 determines the whether the TCI state of the neighbor cell is known or unknown (illustrated as a TCI state switch condition 404). Here, the TCI state of the neighbor cell is known 412 because the UE 410 has previously detected the neighbor cell 420 (e.g., per the cell detection 401) and has previously detected the RX beam within a certain time period prior to receiving the TCI state switch command 432. However, if the neighbor cell was not detected prior to receiving the TCI switch command 422, or if the RX beam was unknown or detected long ago (e.g., longer than the certain time period), the UE 410 would determine that the neighbor cell's TCI state is unknown. In this approach, if the target TCI state is known, the UE 510 can determine implicitly that the state of the neighbor cell is also known.

In an example, the neighbor's cell TC state is known to the UE 410 only if the following conditions are met. During the period from the last transmission of an RS resource used for L1-RSRP measurement reporting for the TCI state to the completion of active TCI state switch, where the RS resource for L1-RSRP measurement is the RS in TCI state or QCLed to the TCI state: (i) the TCI state switch command 432 is received within a certain time (e.g., 1,280 ms) upon the last transmission of the RS resource for beam reporting or measurement, (ii) the UE 410 has sent at least one L1-RSRP report for the TCI state before the TCI state switch command 432, (iii) the TCI state remains detectable during the TCI state switching period, (iv) the SSB associated with the TCI state remain detectable during the TCI switching period, and (v) the signal to noise ratio (SNR) of the TCI state is equal or larger than a certain value (e.g., −3 dB). If any of these conditions is not met, the neighbor's cell TCI state is unknown to the UE 410.

Figure 5:
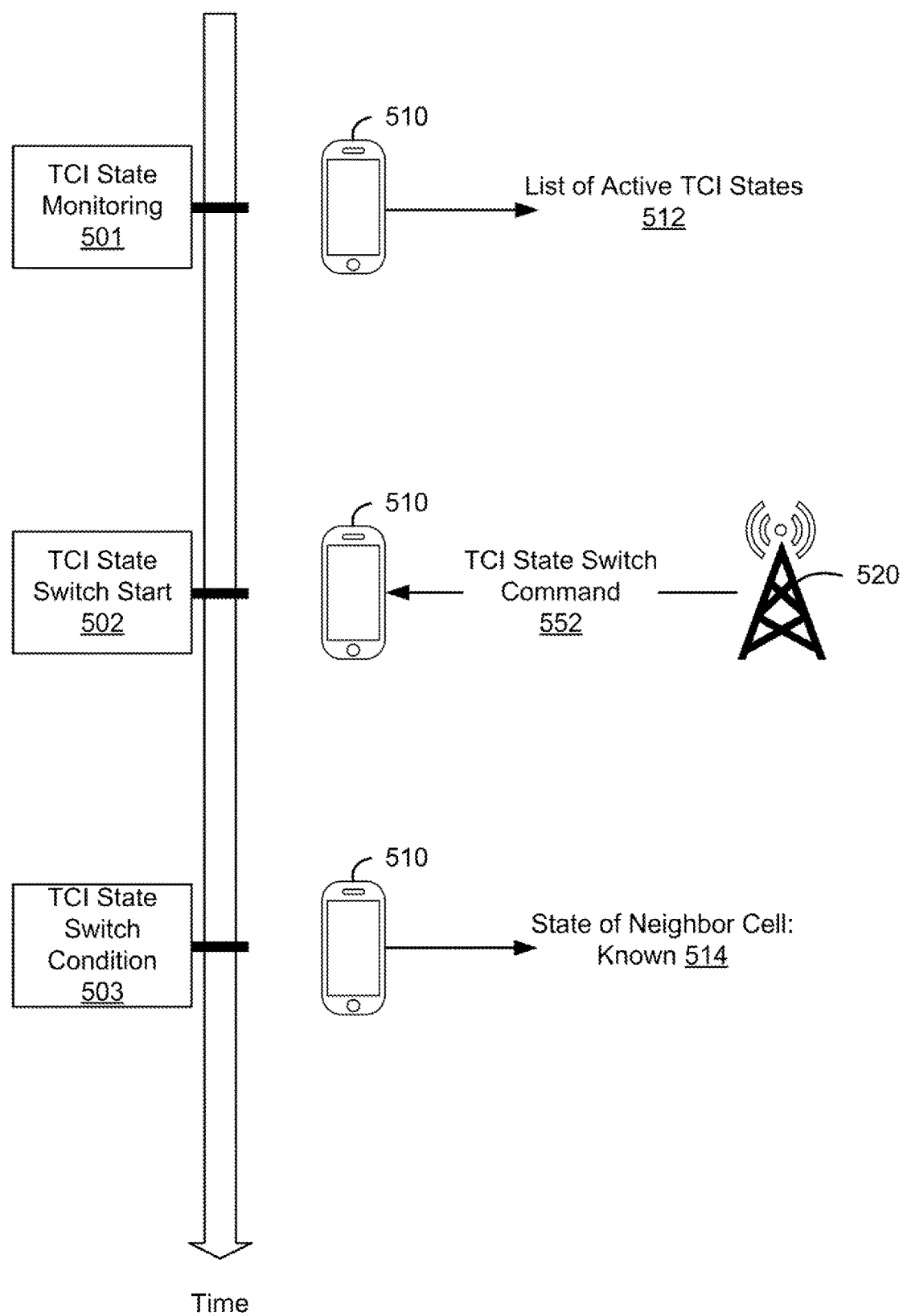
FIG. 5 illustrates another example of determining whether a TCI state of a neighbor cell is known or unknown, in accordance with some embodiments.

FIG. 5 illustrates another example of determining whether a TC state of a neighbor cell is known or unknown, in accordance with some embodiments. Generally, the neighbor cell is a target cell and its TCI state is a target TCI state. The target TCI state is known to a UE 510 if, at least, the target TCI state is identified in a list of active TCI states that the UE 510 maintains.

In an example, the UE 510 monitors multiple TCI state (illustrated as TCI state monitoring 501). The network configures TCI states for the UE 510 and activates some of configured TCI states. For instance, RRC signaling can be used to configure up to one-hundred twenty-eight TC states for PDSCH. MAC CE is then used to activate up to eight of the one-hundred twenty-eight TCI states. The UE 510 maintains a list 512 identifying these eight active TCI states. Further, the UE 510 may have indicated, to the network, UE capability of monitoring TCI states of neighbor cells. In this case, the RRC signaling may have included the target TCI state in the configuration, and the MAC CE may have activated the TCI state.

In the illustration of FIG. 5, subsequent to the TC state monitoring 501, the network may trigger a switch of a TCI state from the serving cell to the neighbor cell. The start of this switch is illustrated as a TCI state switch start 502 and corresponds to receiving a TCI state switch command 532. In an example, the TCI state switch command 532 can be sent from the network via a base station 520 of the serving cell, whereby the base station 520 transmits it to the UE 510 in DCI or MAC CE.

Next, and as part of performing the TCI state switch to the neighbor cell, the UE 510 determines the whether the TCI state of the neighbor cell is known or unknown (illustrated as a TCI state switch condition 503). Here, the TCI state of the neighbor cell is known 514 because the UE 510 this target TCI state is one of the active TC states identified in the list 512. However, if the target TCI state was not an active TCI state, the UE 410 may have determine that target TCI state is unknown. In this approach, if the target TCI state is known, the UE 510 can determine implicitly that the state of the neighbor cell is also known.

Figure 6:
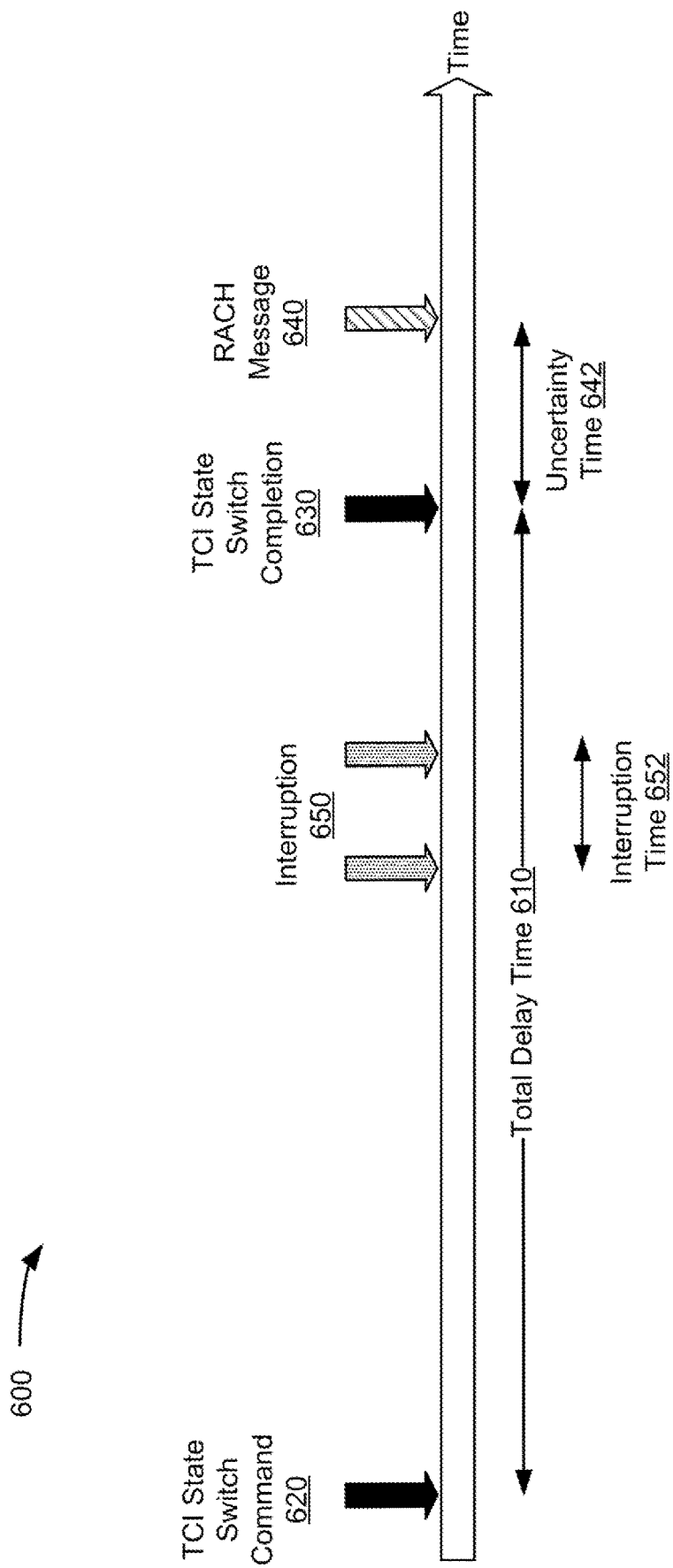
FIG. 6 illustrates an example of a timeline for a TCI state switch, in accordance with some embodiments.

FIG. 6 illustrates an example of a timeline for a TCI state switch, in accordance with some embodiments. The timeline 600 includes a total delay time 610 between reception of a TCI state switch command 620 to completion 630 of a TCI state switch, where the TCI state switch is for switching to a TCI state of a neighbor cell. In particular, when the network activates a new TCI state via MAC CE for PDCCH or via DCI for PDSCH, a UE is allowed some time to prepare to receive with the new TCI state. The total delay time 610 represents a first period of time needed by the UE to do so and can depend on a number of factors, such as whether the neighbor cell is known or unknown to the UE, whether the neighbor cell's TCI state is known or unknown to the UE, whether MAC CE or DCI is used for the activation, whether TO/FO tracking is needed, whether an active BWP switch is needed, UE processing time, and whether a RACH message 640 is sent or not.

The total delay time 610 can be shorter than a second period of time that is an upper bound on the total delay time 610. For example, the second period of time is a predefined maximum time for the switch and corresponds to the worst case scenario (e.g., the total delay time 610 is equal or less than a certain maximum allowable time, where this upper bound corresponds to the state of the neighbor cell being unknown, the neighbor cell's TCI state being unknown, the use of MAC CE, the need for an active BWP switch, the need for TO/FO tracking the transmission of a RACH message, and the like).

Further, the UE can send a RACH message 640 to the network upon the completion 630 of the TCI state switch. In particular, the UE can determine the first available physical random access channel (PRACH) occasion to send the RACH message 640. Uncertainty about the timing of the PRACH occasion can exist and is shown as uncertainty time 642 in FIG. 6 (e.g., the time needed to send the RACH message 640). In an example, the process of performing the TCI state switch includes sending the RACH message 640. In this case, the uncertainty time 642 can be part of the total delay time 610. In either cases, sending the RACH message 640 can be beneficial because the exact length of the total delay time 610 varies depending on the above factors. Thus, the RACH message 640 can indicate to the completion 630 to the network such to reduce the impact of this variability and enable the transmission to the UE without the need to wait until the end of the maximum time. If this TCI state switch is part of a handover, the RACH message 640 may alternatively be sent at the completion of the handover.

In an example, the total delay time 610 includes MAC CE processing time or DCI parsing time, a time for TO/FO tracking, time for RX bean refinement, time for cell identification, time for BWP switch, UE processing time, and/or the uncertainty time 642. The MAC CE processing time is used when the TCI switch command is MAC CE and can be defined as "$T_{HARQ}$+predefined time value (e.g., three milliseconds)." $T_{HARQ}$ is the time (which can be defined in a number of slots) needed to send acknowledgement/negative acknowledgement (ACK/NACK) in response to the MAC CE. The DCI parsing time is used if the TCI switch command is DCI. This DCI parsing time can have a predefined time value (e.g., six-hundred microseconds).

The time for TO/FO tracking is included in the total delay time 610 only if TO/FO tracking is needed before using the TCI state of the neighbor cell. This can be the case when this TCI state is not part of the active TCI state list monitored by UE (e.g., the list 512 of FIG. 5). The time for TO/FO tracking can be defined as "$T_{first\text{-}SSB}+T_{SSB\text{-}proc}$", where "$T_{first\text{-}SSB}$" is time to receive the first SSB, "$T_{SSB\text{-}proc}$" is time needed for processing this SSB.

The for RX bean refinement is included in the total delay time 610 only if the TCI state of the neighbor cell is unknown. The time for RX beam refinement can be defined as "$T_{L1\text{-}RSRP}$", which is the measurement period for performing L1-RSRP measurement.

The time for cell identification is included in the total delay time 610 only if the state of the neighbor cell is unknown (e.g., this target cell for the TCI state switch has not been detected by the UE). Cell identification time includes PSS/SSS detection, SSB measurement time, and time for SSB index detection. Accordingly, the time for cell identification can be "$T_{identify\_intra\_without\_index}$" specified in section 9.2.5.1 of 3GPP TS 38.133 V17.0.0 (2021-01) for intra frequency neighbor cell in FR2 if deriveSSB-Index-FromCell is enabled and the target cell is on the same frequency as serving cell. The time for cell identification can be "$T_{identify\_intra\_with\_index}$" specified in the same for intra frequency neighbor cell in FR1 and FR2 if derieSSB-IndexFromCell is not enabled. Alternatively, the time for cell identification can be "$T_{identify\_inter\_with\_index}$" specified in section 9.3.4 of 3GPP TS 38.133 V17.0.0 (2021-01) for inter-frequency neighbor cell.

In case the neighbor cell is in a different frequency layer (inter-frequency) or the bandwidth of initial or active BWP of the neighbor cell is different from the serving cell, additional time for BWP switch is included in the total delay time 610. The time for BWP switch can be defined as based on a timer or a DCI-based BWP switching delay for single component carrier similar to the definition in section 8.6.2 of 3GPP TS 38.133 V17.0.0 (2021-01).

The UE processing time represents additional processing time the UE may need to receive and apply all the parameters and configuration to complete a handover to the neighbor cell. This time can be predefined to a certain value (e.g., up to ten milliseconds) and is included in the total delay time 610 when the TCI state switch is used as a trigger for the handover.

As explained herein above, the completion 630 of the TCI State switch to the neighbor cell can be indicated by a RACH message 640 such that the UE can start receiving on the TCI State of the neighbor cell. The uncertainty to transmit the RACH message 640 is the uncertainty in acquiring the first available PRACH occasion in the neighbor cell which can be up to the summation of SSB to PRACH occasion association period and a predefined time value (e.g., a few milliseconds). This uncertainty time 642 is included in the total delay time 610 when RACH messaging is used to indicate completion of TCI state switching.

To illustrate, the MAC CE processing time, the DCI parsing time, the RX beam refinement time, and the TO/FO tracking time can be expressed in the total delay time 610 as following. Upon receiving the TCI state switch command in slot n, the UE should be able to receive PDCCH with the target TC state of the neighbor cell in which TCI state switch occurs at the first slot that is after slot $n+(T_{HARQ}+3N_{slot}^{subframe,\mu}+T_{L1\text{-}RSRP}*K\ 1+TO_k*(T_{first\text{-}SSB}+T_{SSB\text{-}proc})/NR\ slot\ length)*K2+T_{DCI\_Parsing\_Time}*K3$. The UE should be able to receive PDCCH with the old TCI state until slot $n+T_{HARQ}+N_{slot}^{subframe,\mu}$. Similar definitions can be used to include the times of the other factors, whereby a binary multiple "K" can be used per factor to account for the corresponding time depending on whether the corresponding condition is met or not.

K1 is "0" if the TCI state of the neighbor cell is known; otherwise, K1 is "1". K2 is "1" when MAC CE is used; otherwise K2 is "0." Conversely, K3 is "1" if DCI is used and, otherwise, K3 is "0". $T_{HARQ}$ is the timing between DL data transmission and acknowledgement. $T_{first-SSB}$ is time to first SSB transmission after MAC CE command is decoded by the UE; The SSB shall be the QCL-TypeA or QCL-TypeC to target TCI state. $T_{SSB-proc}$=2 ms. $TO_k$=1 if target TCI state is not in the active TCI state list for PDSCH, "0" otherwise. $T_{L1-RSRP}$ is the time for Rx beam refinement. $T_{first-SSB}$ is time to first SSB transmission after L1-RSRP measurement when TCI state switching involves QCL-TypeD. $T_{first-SSB}$ is time to first SSB transmission after MAC CE command is decoded by the UE for other QCL types.

Within the total delay time 610, one or more interruptions 650 of one or more operations (e.g., receive and/or transmit operations) related to one or more other serving CCs can occur. If so, interruption time 652 can be defined as the maximum allowable time for the interruption(s) 650. In an example, the TCI state switch to the neighbor cell can cause an interruption on another serving component carrier if any of the following scenarios occur: (i) the switch is accompanied with a subcarrier spacing (SCS) change (e.g., the neighbor cell uses a CC having an SCS different from that of the CC of the serving cell in the following cases), (ii) a bandwidth change or a center frequency change (e.g., the CC of the neighbor cell has a different bandwidth or uses a different center frequency than the serving CC), or (iii) the UE does not support a measurement gap per frequency range (e.g., per-FR gap). Any of these scenarios, or other scenarios impacting receive or transmit operations (e.g., by needing adjustment to the receiver chain and/or transmit change), may cause the interruption to the other serving CC. As such, the UE should be able to support the interruption, whereby this interruption can be time length of the interruption is bounded by the interruption time 652. The interruption time 652 can be similarly defined as the time allowed for an active BWP switch. An example for defining the interruption time 652 is shown in Table 1 below. In particular, the length of the interruption time 652 can depend on the numerology or a slot length of the other serving CC that is impacted by the interruption. For instance, if the other serving CC has a zero for its numerology, the interruption time 652 can set to one slot, and this slot is equal to one milliseconds. This interruption should also allowed only during the total delay time 610 for the neighbor cell on all other serving CCs.

TABLE 1

| Numerology μ | Slot Length (ms) | Interruption Length X (slots) |
| --- | --- | --- |
| 0 | 1 | 1 |
| 1 | 0.5 | 1 |
| 2 | 0.25 | 3 |
| 3 | 0.125 | 5 |

Figure 7:
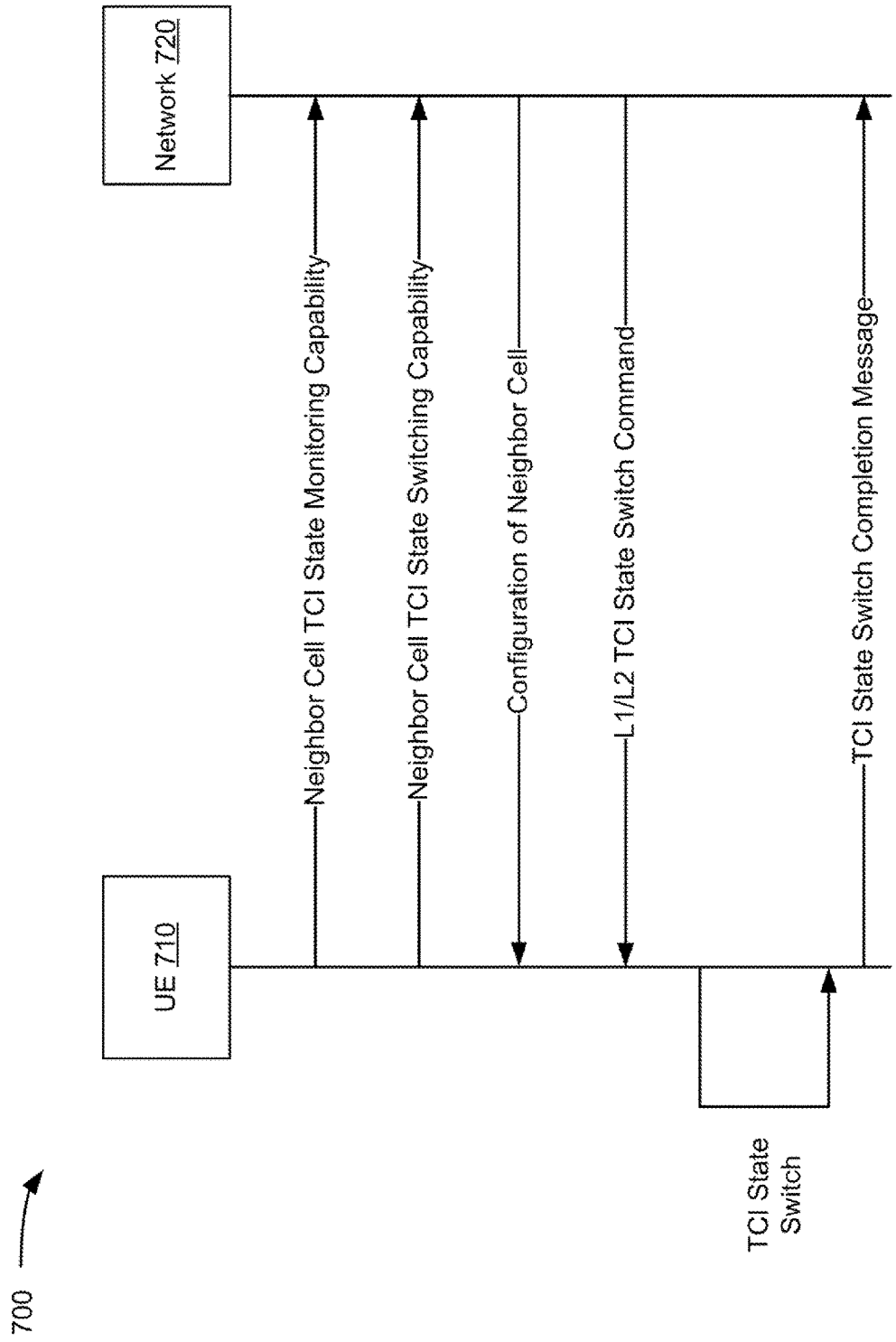
FIG. 7 illustrates an example of a sequence diagram between a user equipment (UE) and a network for L1/L2 inter-cell mobility based on a TCI state switch command, in accordance with some embodiments.

FIG. 7 illustrates an example of a sequence diagram 700 between a UE 710 and a network 720 for L1/L2 inter-cell mobility based on a TCI state switch command, in accordance with some embodiments. Communications of the UE 710 with the network 720 can be carried via one or more base stations of the network 720. The UE 710 can be in a serving cell provided by a base station and using a TCI state of the serving cell. The TCI state switch command can be used for a handover of the UE 710 to a neighbor cell (e.g., provided by the same base station or a different base station of the network 720), whereby the neighbor cell's TCI state is the target TCI state of the switch.

In an example, the sequence diagram 700 includes the UE 710 sending a first UE capability (e.g., tci-StateSwitch-neighborCell) to the network 720 (e.g. before the handover), whereby the first UE capability indicates a capability of the UE 710 for neighbor cell TCI state switching only or for neighbor cell TCI state switching in support of handovers that are triggered by TCI state switch commands. For example, tci-StateSwitch-neighborCell indicates UE's 710 capability to support TCI State switching for neighbor cell in support of an L1/L2 centric inter-cell handover. This UE capability could be mandatory. Further, tci-StateSwitch-neighborCell can signal this switching capability per band.

The sequence diagram 700 also includes the UE 710 sending a second UE capability (e.g., tci-State-neighborCell) to the network 720 (e.g. before the handover), whereby the first UE capability indicates a capability of the UE 710 for neighbor cell TCI state monitoring only or for neighbor cell TCI state monitoring in support of TCI state switching. This capability signaling can be mandatory if UE indicates support of TCI State switching for neighbor cell per the first UE capability. Further, tci-State-neighborCell can signal this monitoring capability per band. for neighbor cell TCI state monitoring. An example illustration of tci-State-neighbor-Cell is shown below. If the UE supports this monitoring capability, the network 720 may configure the UE 720 to maintain the TC state of the neighbor cell in a list of active TCI states.

tci-State-neighborCell

Defines support of TCI-States for PDCCH/PDSCH for neighbor cell. The capability signalling comprises the following parameters:

maxNumberConfiguredTCIsiatesPerCC-nreighborCell indicates the maximum number of configured TCI-states per CC for PDCCH/PDSCH.

maxNuimberActiveTCI-PerBWP-neighborCell indicates the maximum number of activated TCI-states per BWP per CC, including control and data for neighbor cell.

As further illustrated in FIG. 7, the sequence diagram 700 includes the network 720 sending configuration information about the neighbor cell. For example, the configuration information can define parameters for detecting the neighbor cell, performing measurements on signals sent for the neighbor cell, and any other information needed for connecting or performing a handover to the neighbor cell. Such information can configure the UE 710 to perform measurement and reporting including, for instance, any or a combination of L1-RSRP, Layer 3 (L3)-RSRP, time- or spatial-domain-filtered L1-RSRP, or L1-SINR. Further, this information can configure the UE 710 to send a RACH message for indicating the completion of a TCI state switch or handover. This can include an indication of a specific uplink beam for RACH or, alternatively, a candidate set of uplink beams for the RACH. In addition, the configuration information can configure the neighbor cell's TCI state for the UE 710 and indicate whether this TC state should be activated. In an example, the configuration information can be sent via RRC signaling (other than an RRC Reconfiguration signaling) and/or L2 signaling (other than or the same as a MAC CE for a TCI state switch).

At some point, and as illustrated with the fourth step in the sequence diagram 700, the network 720 sends an L1/L2 TCI state switch command to the UE 710. The L1/L2 TCI state switch command can be a MAC CE or DCI and can, for instance, indicate the neighbor cell and the target TCI state.

Depending on the configuration information, this L1/L2 TCI state switch command can also indicate the UL beam for the RACH.

In response to the L1/L2 TCI state switch command, the sequence diagram 700 includes the UE 710 performing a TCI state switch process from the TCI state of the serving cell to the TCI state of the neighbor cell. This process can include determining TCI state switch conditions, such as whether the state of the neighbor cell is known or unknown to the UE 710 and whether the neighbor cell's TCI state is known or unknown to the UE 710, performing measurements, performing tracking, and the like. The process may be completed within a total delay time.

The sequence diagram 700 can also include the UE 710 sending a TCI state switch completion message upon completion of the TCI state switch process (or completion of the handover). The TCI state switch completion message can be a RACH message sent on a UL beam of the serving cell or the neighbor cell depending on, for example, how the network 720 configures the UE 710.

Figure 8:
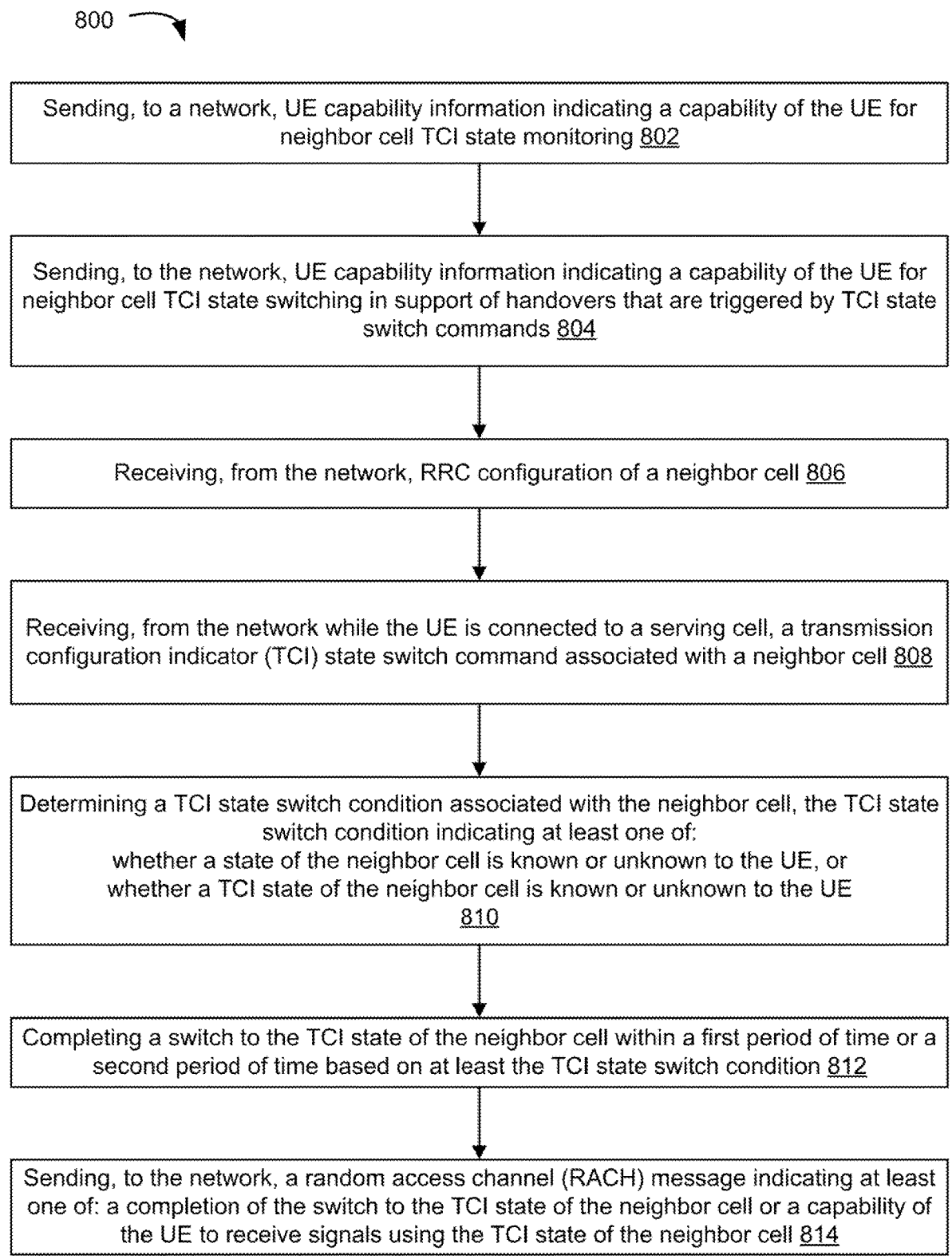
FIG. 8 illustrates an example of an operational flow/algorithmic structure for L1/L2 inter-cell mobility based on a TCI state switch command associated with a neighbor cell, in accordance with some embodiments.

FIG. 8 illustrates an example of an operational flow/algorithmic structure 800 for L1/L2 inter-cell mobility based on a TCI state switch command, in accordance with some embodiments. A UE can implement the operational flow/algorithmic structure 800 to perform a TCI state switch associated with a neighbor cell. This switch may, but need not, be part of a handover from a serving cell to the neighbor cell. The operation flow/algorithmic structure 800 may be performed or implemented by the UE such as, for example, the UE 104, 310, 410, 510, 710, 310, 410, 1000, or components thereof, for example, processors 1004. The UE can communicate with a network by being communicatively coupled with one more base stations, each providing a cell.

The operation flow/algorithmic structure 800 may include, at 802, sending, to the network-, UE capability information indicating a capability of the UE for neighbor cell TCI state monitoring. For example, this UE capability information includes tci-State-neighborCell.

The operation flow/algorithmic structure 800 may include, at 804, sending, to the network, UE capability information indicating a capability of the UE for neighbor cell TCI state switching in support of handovers that are triggered by TCI state switch commands. For example, this UE capability information includes tci-StateSwitch-neighborCell.

The operation flow/algorithmic structure 800 may include, at 806, receiving, from the network, RRC configuration of the neighbor cell. For example, the RRC configuration includes information to configure the UE to perform L1-RSRP, L3-RSRP, time- or spatial-domain-filtered L1-RSRP, or L1-SINR measurements on RS of the neighbor cell and to send a RACH message on a UL beam, among other things.

The operation flow/algorithmic structure 800 may include, at 808, receiving, from the network while the UE is connected to the serving cell (e.g., by using a serving CC provided by a base station of the serving cell), a TCI state switch command associated with the neighbor cell. The TCI switch command can be MAC CE or DCI that triggers a switch to a TCI state of the neighbor cell.

The operation flow/algorithmic structure 800 may include, at 810, determining a TCI state switch condition associated with the neighbor cell. The TCI state switch condition indicates at least one of whether a state of the neighbor cell is known or unknown to the UE, or whether the TCI state of the neighbor cell is known or unknown to the UE. As described in connection with FIGS. 3-5, different definitions can be used to enable this determination.

The operation flow/algorithmic structure 800 may include, at 812, completing a switch to the TCI state of the neighbor cell within a first period of time or a second period of time based on at least the TCI state switch condition. For example, the first period can be a total delay time that depends on the determined state condition in addition to, for instance, whether MAC CE or DCI is used to trigger the switching, whether TO/FO tracking is needed, whether an active BWP switch is needed, UE processing time, and whether a RACH message is to be sent or not. The TCI state switching can include performing detecting the neighbor cell, performing the needed measurements per the RRC configuration, and the like.

The operation flow/algorithmic structure 800 may include, at 814, sending, to the network, a RACH message indicating at least one of a completion of the switch to the TCI state of the neighbor cell or a capability of the UE to receive signals using the TC state of the neighbor cell. The capability indication can correspond to indicating that the handover is complete.

Figure 9:
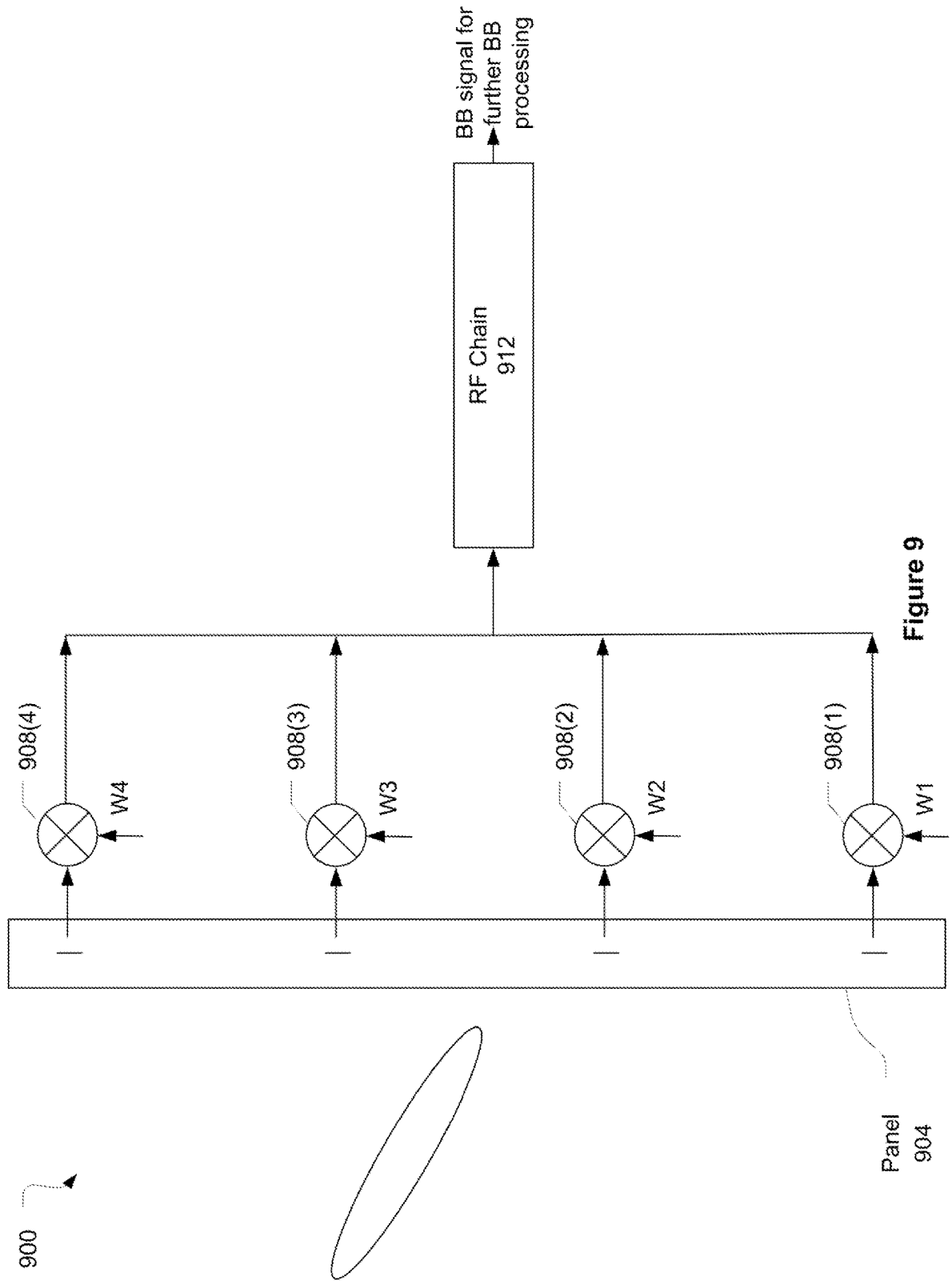
FIG. 9 illustrates an example of receive components, in accordance with some embodiments.

FIG. 9 illustrates receive components 900 of the UE 104 in accordance with some embodiments. The receive components 900 may include an antenna panel 904 that includes a number of antenna elements. The panel 904 is shown with four antenna elements, but other embodiments may include other numbers.

The antenna panel 904 may be coupled to analog beamforming (BF) components that include a number of phase shifters 908(1)-908(4). The phase shifters 908(1)-908(4) may be coupled with a radio-frequency (RF) chain 912. The RF chain 912 may amplify a receive analog RF signal, down-convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 908(1)-908(4) to provide a receive beam at the antenna panel 904. These BF weights may be determined based on the channel-based beamforming.

Figure 10:
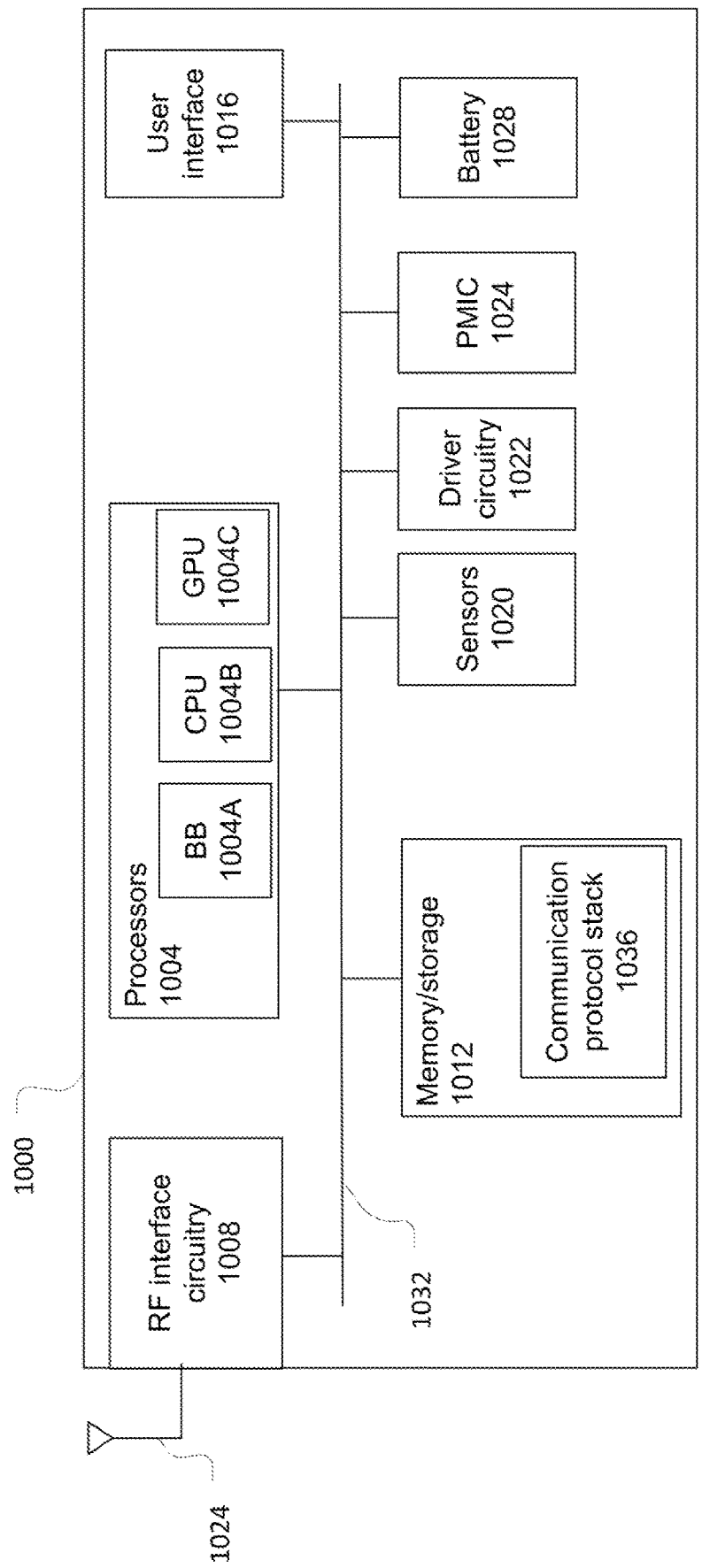
FIG. 10 illustrates an example of a UE, in accordance with some embodiments.

FIG. 10 illustrates a UE 1000 in accordance with some embodiments. The UE 1000 may be similar to and substantially interchangeable with UE 104 of FIG. 1.

Similar to that described above with respect to UE 104, the UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1000 may include processors 1004, RF interface circuitry 1008, memory/storage 1012, user interface 1016, sensors 1020, driver circuitry 1022, power management integrated circuit (PMIC) 1024, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangements of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1004A may also access group information 1024 from memory/storage 1012 to determine search space groups in which a number of repetitions of a PDCCH may be transmitted.

The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1008 may include transceiver circuitry and a radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1024 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1024.

In various embodiments, the RF interface circuitry 1008 may be configured to transmit/receive signals in a manner compatible with NR access technologies.

The antenna 1024 may include a number of antenna elements that each convert electrical signals into radio waves to travel through the air and to convert received radio waves into electrical signals. The antenna elements may be arranged into one or more antenna panels. The antenna 1024 may have antenna panels that are omnidirectional, directional, or a combination thereof to enable beamforming and multiple input, multiple output communications. The antenna 1024 may include microstrip antennas, printed antennas fabricated on the surface of one or more printed circuit boards, patch antennas, phased array antennas, etc. The antenna 1024 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter aha, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
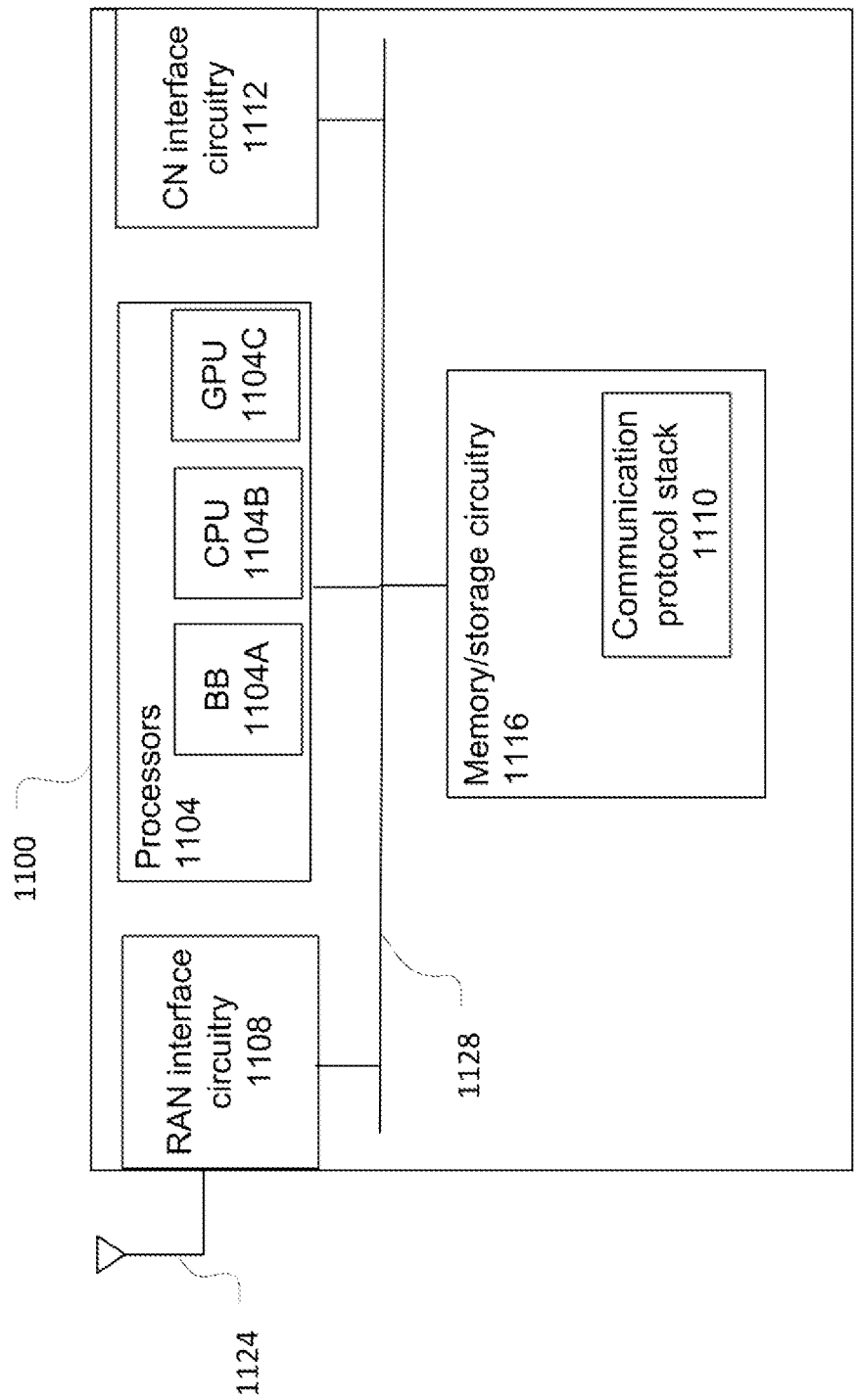
FIG. 11 illustrates an example of a base station, in accordance with some embodiments.

FIG. 11 illustrates a gNB 1100 in accordance with some embodiments. The gNB node 1100 may be similar to and substantially interchangeable with gNB 98. A base station, such as the base station 112, can have the same or similar components as the gNB 1100.

The gNB 1100 may include processors 1104, RF interface circuitry 1108, core network (CN) interface circuitry 1112, and memory/storage circuitry 1116.

The components of the gNB 1100 may be coupled with various other components over one or more interconnects 1128.

The processors 1104, RF interface circuitry 1108, memory/storage circuitry 1116 (including communication protocol stack 1110), antenna 1124, and interconnects 1128 may be similar to like-named elements shown and described with respect to FIG. 9.

The CN interface circuitry 1112 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method. The method is implemented on a user equipment (UE). The method comprises: receiving, from the network while the UE is connected to a serving cell, a transmission configuration indicator (TCI) state switch command associated with a neighbor cell; determining a TCI state switch condition associated with the neighbor cell, the TCI state switch condition indicating at least one of: whether a state of the neighbor cell is known or unknown to the UE, or whether a TCI state of the neighbor cell is known or unknown to the UE; and completing a switch to the TCI state of the neighbor cell within a first period of time or a second period of time based on at least the TC state switch condition.

Example 2 includes a method of example 1, wherein the first period of time is shorter than the second period of time, wherein the second period of time is a predefined maximum delay time for the switch, and wherein the switch is completed within the first period of time based on at least one of the state of the neighbor cell or the TCI state being known.

Example 3 includes a method of any preceding examples 1-2, wherein the TCI state switch command comprises a downlink control information (DCI) or a media access control (MAC) control element (CE) requesting the switch to the TCI state.

Example 4 includes a method of example 3, wherein the DCI or the MAC CE triggers a handover from the serving cell to the neighbor cell based on the switch to the TCI state, and wherein the serving cell and the neighbor cell have a same frequency or different frequencies.

Example 5 includes a method of any preceding examples 1-4, wherein the state of the neighbor cell is determined to be known upon a detection by the UE of the neighbor cell.

Example 6 includes a method of example 5 further comprising: prior to receiving the TC state switch command: receiving, from the network, a radio resource control (RRC) configuration of the neighbor cell; and detecting at least a primary synchronization signal (PSS) or a secondary synchronization signal (SSS) of the neighbor cell.

Example 7 includes a method of any preceding examples 1-6, wherein the TCI state of the neighbor cell is determined to be known upon a detection by the UE that a receive (RX) beam from the neighbor cell is known, wherein the RX beam is used for reception from the neighbor cell of a reference signal (RS) associated with the TCI state of the neighbor cell.

Example 8 includes a method of example 7 further comprising: determining that the RX beam is known by at least determining that the UE has measured and reported a layer 1 (L1) measurement on the RS within a predefined time prior to receiving the TCI state switch command.

Example 9 includes a method of any preceding examples 1-8, wherein the TCI state of the neighbor cell is determined to be known a detection by the EU of the neighbor cell and upon a detection by the UE that a receive (RX) beam from the neighbor cell is known.

Example 10 includes a method of any preceding examples 1-9, wherein the first period of time is a total delay time for the switch, wherein the second period of time is an upper bound on the total delay time, wherein the total delay time is longer when the state of the neighbor cell is unknown relative to when the state of the neighbor cell is known, and wherein the total delay time is longer when the TCI state is unknown relative to when the TCI state is known.

Example 11 includes a method of any preceding examples 1-10, wherein the first period of time is a total delay time for the switch, wherein the TCI state switch command comprises either a downlink control information (DCI) or a media access control (MAC) control element (CE) requesting the switch to the TCI state, and wherein the total delay time is longer when the TCI state switch command comprises the MAC CE relative to when the TCI state switch command comprises the DCI.

Example 12 includes a method of any preceding examples 1-11, wherein the first period of time is a total delay time for the switch, and the method further comprising maintaining a list of active TCI states; and determining whether the TCI state of the neighbor cell is one of the active TCI states, wherein the total delay time is shorter when the TCI state is one of the active TCI states relative to when the TCI state is not one of the active TCI states.

Example 13 includes a method of any preceding examples 1-12, wherein the first period of time is a total delay time for the switch, wherein the state of the neighbor cell is detected to be unknown, and wherein the total delay time comprises a time to complete a cell identification of the neighbor cell.

Example 14 includes a method of any preceding examples 1-13, wherein the first period of time is a total delay time for the switch, wherein the neighbor cell has at least one of a different frequency or a different bandwidth part (BWP) from the serving cell, and wherein the total delay time comprises a time to complete a BWP switch.

Example 15 includes a method of any preceding examples 1-14, wherein the first period of time is a total delay time for the switch, wherein the TCI state switch command triggers a handover from the serving cell to the neighbor cell, and wherein the total delay time comprises UE processing time to complete the handover.

Example 16 includes a method of any preceding examples 1-15 further comprising: sending, to the network, a random access channel (RACH) message indicating at least one of: a completion of the switch to the TCI state of the neighbor cell or a completion of a handover to the neighbor cell.

Example 17 includes a method of example 16, wherein the first period of time is a total delay time for the switch, wherein the total delay time comprises time to acquire a first available physical random access channel (PRACH) occasion.

Example 18 includes a method of example 16, wherein the RACH message is sent on an uplink (UL) beam, wherein the UL beam is configured in a radio resource control (RRC) configuration and activated by the TCI state switch command.

Example 19 includes a method of example 16, wherein the RACH message is sent on an uplink (UL) beam, wherein the UL beam is configured by the TC state switch command.

Example 20 includes a method of any examples 1-19, wherein completing the switch to the TCI state causes an interruption of a process on a component carrier (CC) based on the UE not supporting a measurement gap per frequency range or in the neighbor cell having a different subcarrier frequency, a different bandwidth, or a different center frequency from the serving cell.

Example 21 includes a method of example 20, wherein the interruption is associated with a total interruption time, and wherein the total interruption time is based on a numerology or a slot length of the component carrier.

Example 22 includes a method of any examples 1-21 further comprising: sending, to the network and prior to receiving the TCI state switch command, UE capability information indicating a capability of the UE for neighbor cell TCI state monitoring.

Example 23 includes a method of example 22 further comprising: maintaining the TCI state of the neighbor cell in a list of active TCI states based on the capability of the UE.

Example 24 includes a method of example 22, wherein the UE capability information indicates the capability per frequency band.

Example 25 includes a method of any examples 1-24 further comprising: sending, to the network and prior to receiving the TCI state switch command, UE capability information indicating a capability of the UE for neighbor cell TCI state switching in support of handovers that are triggered by TCI state switch commands.

Example 26 includes a method of example 25, wherein the UE capability information indicates the capability per frequency band.

Example 27 includes a UE comprising one or more processors and one or more memories storing computer-readable instructions that, upon execution by the one or more processors, configure the UE to perform one or more elements of a method described in or related to any of the examples 1-26.

Example 28 includes a UE comprising means to perform one or more elements of a method described in or related to any of the examples 1-26.

Example 29 includes one or more non-transitory computer-readable media storing instructions, that upon execution on a user equipment (UE), cause the UE to perform one or more elements of a method described in or related to any of the examples 1-26.

Example 30 includes a UE comprising logic, modules, or circuitry to perform one or more elements of a method described in or related to any of the examples 1-26.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method implemented on a user equipment (UE) that is communicatively coupled with a network, the method comprising:
   receiving, from the network while the UE is connected to a serving cell, a transmission configuration indicator (TCI) state switch command associated with a neighbor cell;
   determining a TCI state switch condition associated with the neighbor cell, the TCI state switch condition indicating at least one of:
      whether a state of the neighbor cell is known or unknown to the UE, or
      whether a TCI state of the neighbor cell is known or unknown to the UE; and
   completing a switch to the TCI state of the neighbor cell within a first period of time or a second period of time based on at least the TCI state switch condition.

2. The method of claim 1, wherein the first period of time is shorter than the second period of time, wherein the second period of time is a predefined maximum delay time for the switch, and wherein the switch is completed within the first period of time based on at least one of the state of the neighbor cell or the TCI state being known.

3. The method of claim 1, wherein the TCI state switch command comprises a downlink control information (DCI) or a media access control (MAC) control element (CE) requesting the switch to the TCI state.

4. The method of claim 1, wherein the TCI state of the neighbor cell is determined to be known upon a detection by the UE that a receive (RX) beam from the neighbor cell is known, wherein the RX beam is used for reception from the neighbor cell of a reference signal (RS) associated with the TCI state of the neighbor cell, and wherein the method further comprises:
   determining that the RX beam is known by at least determining that the UE has measured and reported a layer 1 (L1) measurement on the RS within a predefined time prior to receiving the TCI state switch command.

5. The method of claim 1, wherein the state of the neighbor cell is determined to be known upon a detection by the UE of the neighbor cell, and wherein the method further comprises:
   prior to receiving the TCI state switch command:
      receiving, from the network, a radio resource control (RRC) configuration of the neighbor cell; and
      detecting at least a primary synchronization signal (PSS) or a secondary synchronization signal (SSS) of the neighbor cell.

6. The method of claim 1, wherein the TCI state of the neighbor cell is determined to be known a detection by the UE of the neighbor cell and upon a detection by the UE that a receive (RX) beam from the neighbor cell is known.

7. A user equipment (UE) comprising:
   one or more processors; and
   one or more memories storing computer-readable instructions that, upon execution by the one or more processors, configure the UE to:
      receive, from a network while the UE is connected to a serving cell, a transmission configuration indicator (TCI) state switch command associated with a neighbor cell;
      determine a TCI state switch condition associated with the neighbor cell, the TCI state switch condition indicating at least one of:
         whether a state of the neighbor cell is known or unknown to the UE, or
         whether a TCI state of the neighbor cell is known or unknown to the UE; and
      complete a switch to the TCI state of the neighbor cell within a first period of time or a second period of time based on at least the TCI state switch condition.

8. The UE of claim 7, wherein the first period of time is a total delay time for the switch, wherein the TCI state switch command triggers a handover from the serving cell to the neighbor cell, and wherein the total delay time comprises UE processing time to complete the handover.

9. The UE of claim 7, wherein the execution of the computer-readable instructions further configures the UE to:
   send, to the network, a random access channel (RACH) message indicating at least one of: a completion of the switch to the TCI state of the neighbor cell or a completion of a handover to the neighbor cell.

10. The UE of claim 7, wherein completing the switch to the TCI state causes an interruption of a process on a component carrier (CC) based on the UE not supporting a measurement gap per frequency range or on the neighbor cell having a different subcarrier frequency, a different bandwidth, or a different center frequency from the serving cell.

11. The UE of claim 7, wherein the first period of time is a total delay time for the switch, wherein the second period of time is an upper bound on the total delay time, wherein the total delay time is longer when the state of the neighbor cell is unknown relative to when the state of the neighbor cell is known, and wherein the total delay time is longer when the TCI state is unknown relative to when the TCI state is known.

12. The UE of claim 7, wherein the first period of time is a total delay time for the switch, wherein the TCI state switch command comprises either a downlink control information (DCI) or a media access control (MAC) control element (CE) requesting the switch to the TCI state, and wherein the total delay time is longer when the TCI state switch command comprises the MAC CE relative to when the TCI state switch command comprises the DCI.

13. The UE of claim 7, wherein the first period of time is a total delay time for the switch, wherein the execution of the computer-readable instructions further configures the UE to:
   maintain a list of active TCI states; and
   determine whether the TCI state of the neighbor cell is one of the active TCI states, wherein the total delay time is shorter when the TCI state is one of the active TCI states relative to when the TCI state is not one of the active TCI states.

14. The UE of claim 7, wherein the first period of time is a total delay time for the switch, wherein the state of the neighbor cell is detected to be unknown, and wherein the total delay time comprises a time to complete a cell identification of the neighbor cell.

15. The UE of claim 7, wherein the first period of time is a total delay time for the switch, wherein the neighbor cell has at least one of a different frequency or a different bandwidth part (BWP) from the serving cell, and wherein the total delay time comprises a time to complete a BWP switch.

16. One or more non-transitory computer-readable storage media storing instructions that, upon execution on a user equipment (UE), cause the UE to perform operations comprising:
   receiving, from a network while the UE is connected to a serving cell, a transmission configuration indicator (TCI) state switch command associated with a neighbor cell;
   determining a TCI state switch condition associated with the neighbor cell, the TCI state switch condition indicating at least one of:
      whether a state of the neighbor cell is known or unknown to the UE, or
      whether a TCI state of the neighbor cell is known or unknown to the UE; and
   completing a switch to the TCI state of the neighbor cell within a first period of time or a second period of time based on at least the TCI state switch condition.

17. The one or more non-transitory computer-readable storage media of claim 16, wherein the operations further comprise:
   sending, to the network and prior to receiving the TCI state switch command, UE capability information indicating a capability of the UE for neighbor cell TCI state monitoring.

18. The one or more non-transitory computer-readable storage media of claim 17, wherein the operations further comprise:
   maintaining the TCI state of the neighbor cell in a list of active TCI states based on the capability of the UE.

19. The one or more non-transitory computer-readable storage media of claim 17, wherein the UE capability information indicates the capability per frequency band.

20. The one or more non-transitory computer-readable storage media of claim 16, wherein the operations further comprise:
   sending, to the network and prior to receiving the TCI state switch command, UE capability information indicating a capability of the UE for neighbor cell TCI state switching in support of handovers that are triggered by TCI state switch commands.

* * * * *